United States Patent [19]

Schnoor et al.

[11] Patent Number: 5,473,817
[45] Date of Patent: Dec. 12, 1995

[54] METHOD OF MAKING COOLED ROCKET COMBUSTION CHAMBER CONSTRUCTION

[75] Inventors: Richard J. Schnoor; Michael M. Surls, both of Jupiter, Fla.

[73] Assignee: United Technologies Corporation, Hartford, Conn.

[21] Appl. No.: 213,391

[22] Filed: Mar. 14, 1994

Related U.S. Application Data

[63] Continuation-in-part of Ser. No. 171,090, Dec. 21, 1993, abandoned.

[51] Int. Cl.$^6$ ................................................. B23P 15/00
[52] U.S. Cl. ................................ 29/890.01; 29/890.02
[58] Field of Search ........................... 29/890.01, 423, 29/890.02; 249/174, 176; 60/260, 267, 271

[56] References Cited

U.S. PATENT DOCUMENTS

| | | | |
|---|---|---|---|
| 4,942,653 | 7/1990 | Hawkinson | 29/890.01 |
| 5,075,966 | 12/1991 | Mantkowski | 29/890.01 |
| 5,226,598 | 7/1993 | Woehrl | 29/890.01 |
| 5,233,755 | 8/1993 | Vandendriessche | 29/890.01 |
| 5,249,357 | 10/1993 | Holmes et al. | 29/890.01 |
| 5,309,636 | 5/1994 | McGovern et al. | 29/890.01 |

*Primary Examiner*—Irene Cuda
*Attorney, Agent, or Firm*—Christopher T. Hayes

[57] ABSTRACT

A method of producing a rocket combustion chamber/nozzle assembly in which a liner blank is deformed against the forming surface of a die to form a finished cooling liner, a structural jacket is electro-formed about the finished cooling liner, and fluid manifolds are secured to the finished cooling liner and structural jacket assembly.

17 Claims, 9 Drawing Sheets

METHOD OF MAKING COOLED ROCKET COMBUSTION CHAMBER CONSTRUCTION

This is a CIP of U.S. Ser. No. 08/17/090 filed Dec. 21, 1993, now abandoned.

FIELD OF THE INVENTION

This invention is related to rocket chambers having cooling liners, and particularly to a method of manufacturing such chambers.

BACKGROUND OF THE INVENTION

Rocket engines, such as those used on space missions, are costly to design and manufacture. In addition, there is a continuing and growing need for rockets capable of carrying payloads to space or near-Earth orbits. Consequently, manufacturers of such rocket engines are constantly seeking new ways to reduce the cost of producing the components which go into a rocket engine.

One such component is the rocket combustion chamber/nozzle assembly within which the propellants of the rocket engine are mixed, combusted and accelerated. Because of the extremely high temperatures of the propellants moving through the combustion chamber, the walls of the thrust chamber must be cooled in those applications which require sustained engine firings. Such cooling is typically accomplished by flowing a coolant through tubes or channels which form the inner surface of the combustion chamber.

A typical example of such thrust chambers is shown in U.S. Pat. No. 3,208,132 to Escher, which discloses a rocket chamber produced by forming coolant flow passages within two sheets by an explosive forming process. The formed sheets must be subsequently welded or brazed together to form individual flow passages, and the integrity of these welds is difficult to inspect. U.S. Pat. No. 3,190,070 to Neu discloses a rocket chamber formed from a plurality of pre-formed coolant tubes. The tubes must be manufactured to close tolerances to ensure that the resulting tube bundle adequately shields the structural jacket of the chamber from the combustion products. U.S. Pat. No. 3,595,025 to Stockel et al discloses a rocket chamber liner having grooves which, when mated with a structural jacket, form cooling channels. These grooves must be machined into the liner, and therefore require a significant amount of labor to produce.

What is needed is a method of making a rocket combustion chamber/nozzle assembly which does not require exacting tube tolerances, is less labor intensive than the prior art, and does not incorporate welds or brazes that cannot be readily inspected.

SUMMARY OF THE INVENTION

It is therefore an object of the present invention to provide a method for forming a rocket combustion chamber/nozzle assembly that does not incorporate welds or brazes that cannot be readily inspected.

Another object of the present invention to provide a method for forming a rocket combustion chamber/nozzle assembly that is not labor intensive.

According to the method of the present invention, a cooling liner blank is deformed to form a finished cooling liner having a fluted outer surface comprising channels separated by ridges. The channels are filled with a relatively low melting temperature casting material, leaving the ridges exposed. A structural jacket is then electro-formed about the finished cooling liner, attached to the ridges. Fluid manifolds are then secured to the structural jacket and the ends of the channels to provide for fluid flow through the cooling liner, yielding the completed combustion chamber/nozzle assembly.

The foregoing and other features and advantages of the present invention will become more apparent from the following description and accompanying drawings.

BEST MODE FOR CARRYING OUT THE INVENTION

Figure 1:
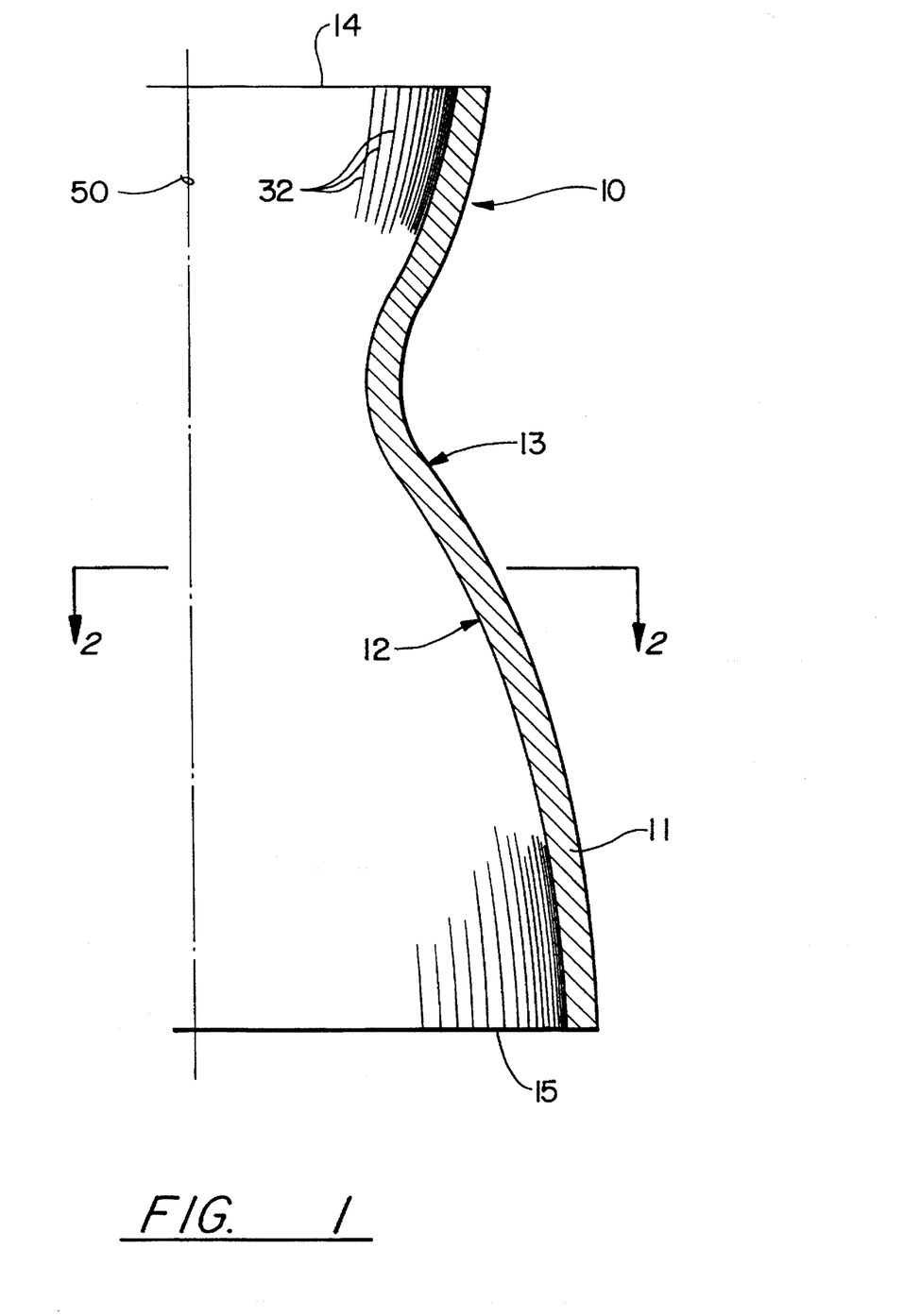
FIG. 1 is a cross-sectional view of one segment of the outer die used in the method of the present invention.
Figure 2:
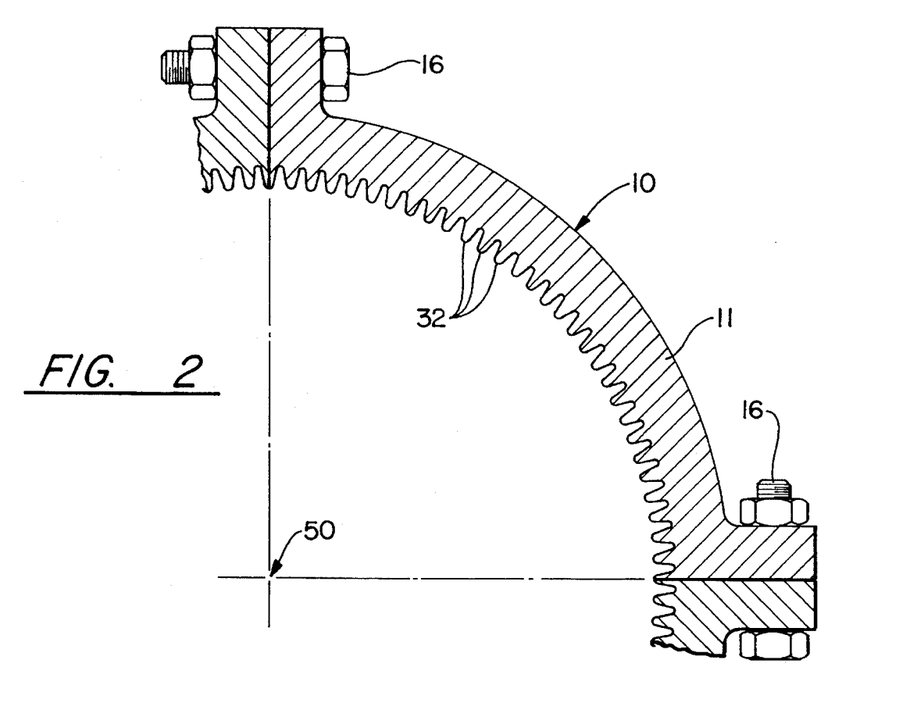
FIG. 2 is a cross-sectional view of the outer die taken along line 2—2 of FIG. 1.

In the preferred embodiment of the method of the present invention, a cooling liner is formed using explosive forming. An outer die 10 for use in the preferred method of forming a rocket thrust chamber/nozzle assembly is shown in FIG. 1 with an axially extending centerline axis 50 defined therethrough. The outer die 10 is made up of a plurality of segments 11, preferably four, which extend axially along the centerline axis 50. Each segment 11 also extends radially about the axial centerline axis 50 forming an arc equal to one fourth of the circumference of the outer die 10, as shown in FIG. 2.

Referring back to FIG. 1, each segment 11 has an inner surface 12 and an outer surface 13 radially outward from the inner surface 12, each surface 12, 13 extending between the axial ends 14, 15 of the outer die 10. The inner surface 12 is scalloped with a plurality of ribs 32 extending along the centerline axis 50 thereof, as shown in FIGS. 1 and 2. As used herein, the term "scalloped" means that for any cross-section of the outer die 10 taken in a plane perpendicular to the centerline axis 50, the inner surface 12 defines a plurality of adjacent parabolas or arc-like sections opening outward from the centerline, each arc within such cross-section located at the same distance from the centerline axis 50, but at different locations about the circumference of the inner surface 12. The inner surface 12 is coated with a releasing agent, and the outer die 10 is made of one of the materials known in the art to have the high strength necessary for forging dies. The outer die 10 has several sets of fasteners 16, preferably bolts, for removably securing each of the segments 11 to adjacent segments 11, as shown in FIG. 2.

Figure 3:
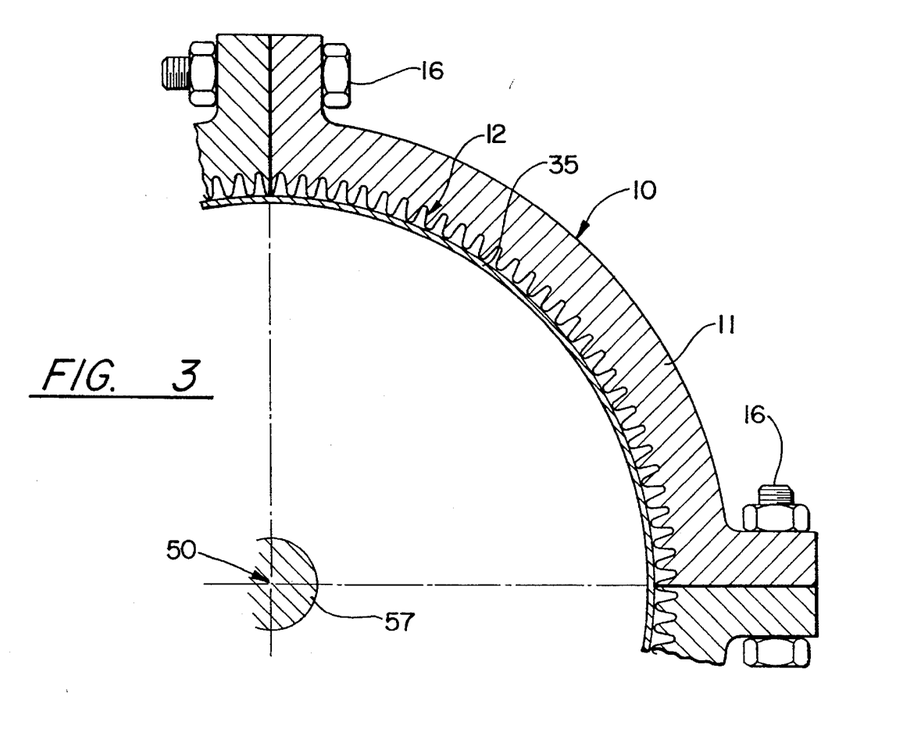
FIG. 3 is a cross-sectional view of the preferred embodiment showing the explosive charge used to deform the liner blank.
Figure 4:
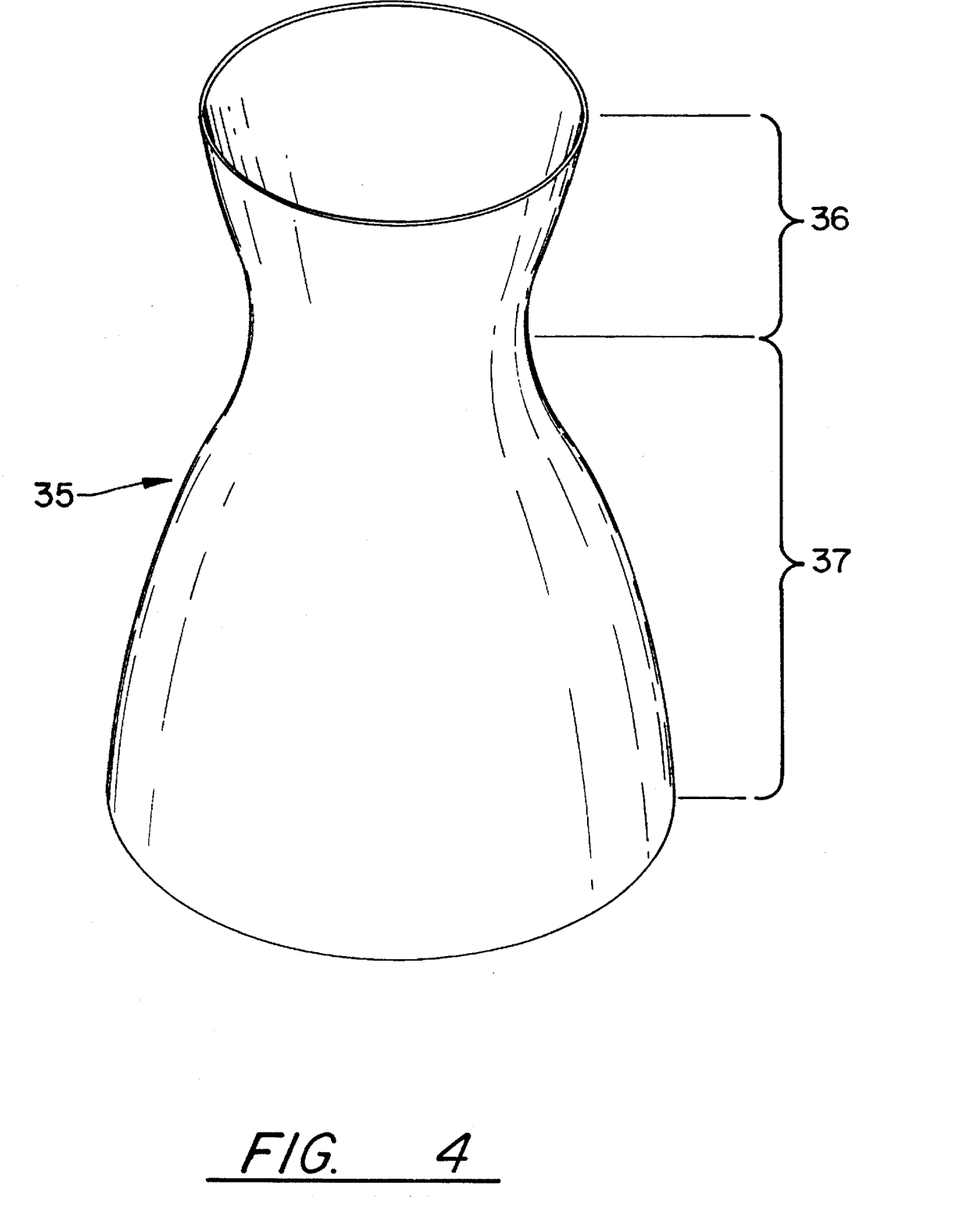
FIG. 4 is a perspective view of the liner blank used in the method of the present invention.

A liner blank 35 is formed into a shape which generally conforms to the axial profile of the inner surface 12 of the outer die 10, as shown in FIGS. 3 and 4. For this embodiment, the liner blank is preferably made of a high temperature or high conductivity material such as Inconel 625, Haynes 188, Haynes 230 or copper. The liner blank 35 has a converging section 36 coaxial with the centerline axis 50 when the liner blank is located within the outer die 10 as described below, and a diverging section 37 coaxial with the centerline axis 50 when the liner blank 35 is located within the outer die 10, and the diverging section 37 is integral with the converging section 36.

The liner blank 35 may be formed by one of the various methods known in the art for forming sheet metal structures from the particular material chosen. For example, if copper is selected as the material, the copper can be extruded in a thin walled, tubular shape having an outer diameter somewhat less than the desired minimum diameter of the liner blank 35. A pair of roller wheels moving along the axis of the tubular copper with the tube wall sandwiched therebetween can then compress the tube wall as needed (commonly referred to as "spinning" by those skilled in the art) to generate the desired liner blank diameter and wall thickness at any given axial position along the liner blank 35.

Figure 5:
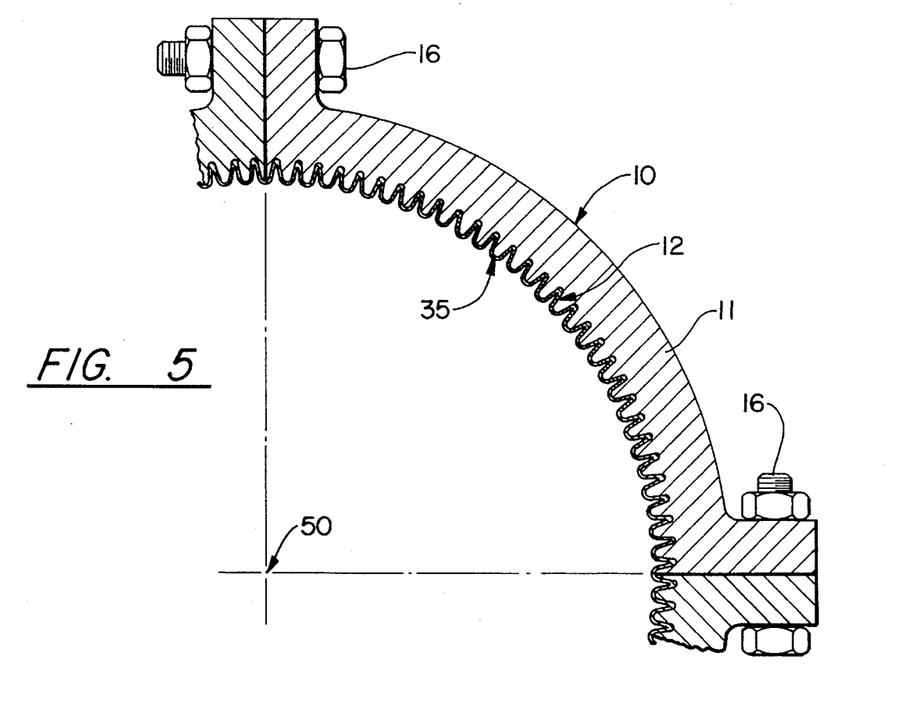
FIG. 5 is the cross-sectional showing the semi-finished liner conforming to the inner forming surface of the outer die.

The method of the present invention is practiced by positioning the segments 11 of the outer die 10 about the liner blank 35 so that the liner blank 35 is in operative contact with the forming surface 12 of the outer die 10, and the segments 11 are fastened together as described above. The outer die 10 and the liner blank 35 are then placed into a vacuum chamber, and a cylindrically shaped charge of explosive material 57, preferably extending the axial length of the outer die 10, is then positioned radially inward of the liner blank 35 along the centerline axis 50, as shown in FIG. 3. One form of explosive that may be used for the explosive charge 57 is that sold under the trademark DETA SHEET by E. I. dupont de Nemours & Company. The air within the vacuum chamber is then evacuated, and the explosive charge 57 is then detonated, thereby generating a pressure shock that deforms the liner blank 35 to conform to the forming surface 12 of the first die 10 as shown in FIG. 5, yielding the finished cooling liner 35.

Figure 6:
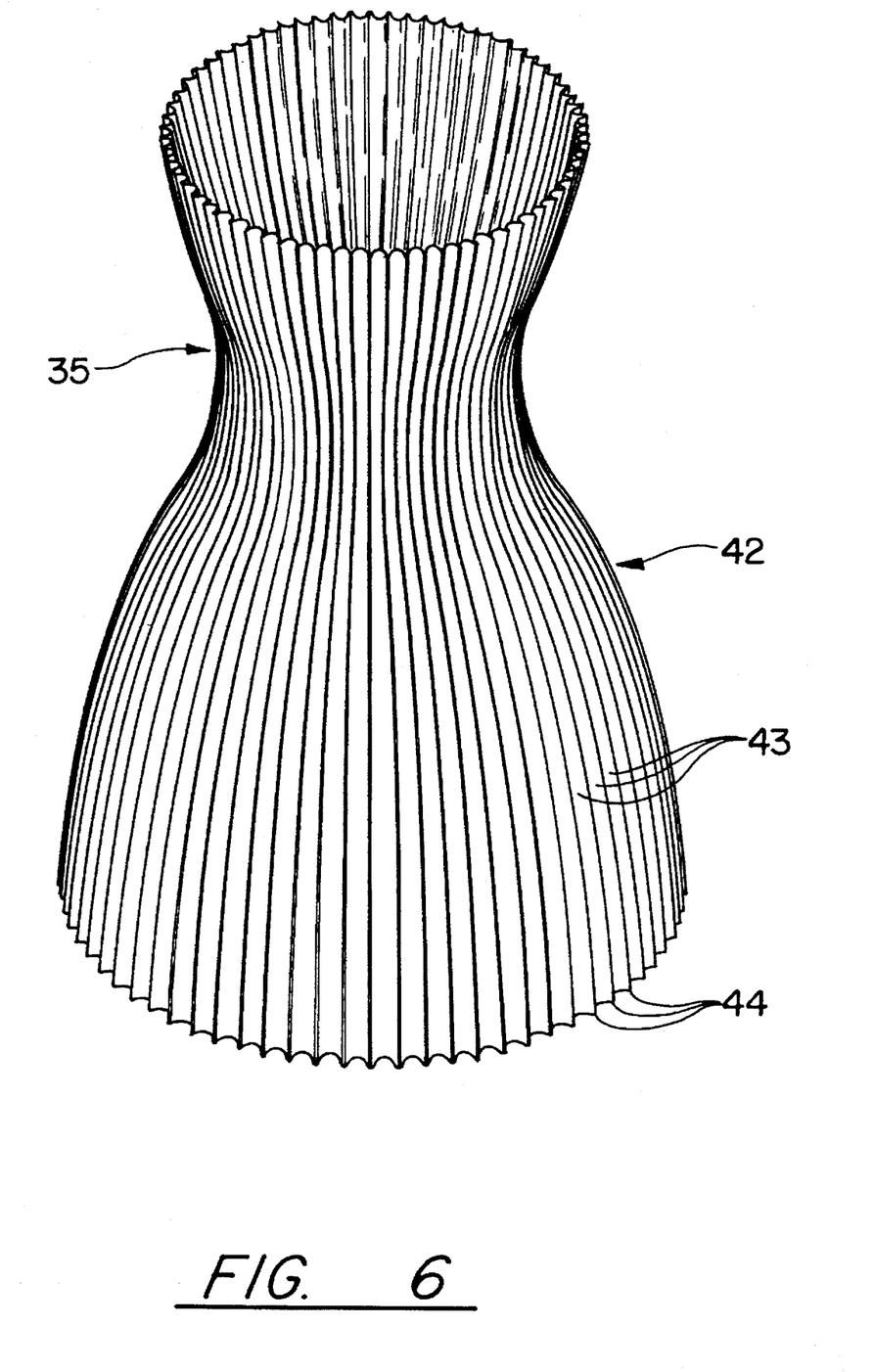
FIG. 6 is a perspective view of the finished cooling liner.
Figure 7:
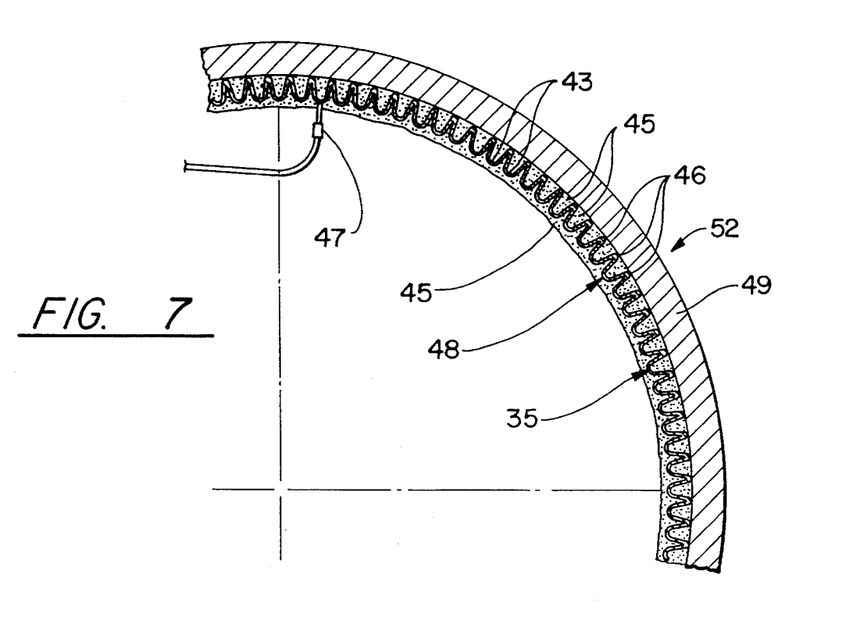
FIG. 7 is a partial cross-sectional view of the finished liner with the channels filled with wax, the inner surface coated with wax, and the structural jacket electro-formed to the ridges of the finished cooling liner.

The outer die 10 and finished cooling liner 35 are then removed from the vacuum chamber, and the fasteners 16 of the outer die 10 are removed, allowing the segments 11 to be removed from the finished cooling liner 35. The finished cooling liner 35 has a fluted outer surface 42 having a plurality of longitudinally extending channels 43 formed by the troughs 33 and ribs 32 of the die 10, as shown in FIG. 6. As those skilled in the art will readily appreciate, the ribs 32 and troughs 33 of the die 10, form a plurality of ridges 44 extending the length of the liner 35 from one end of each channel 43 to the opposite end thereof, and each channel 43 is separated from each immediately adjacent channel 43 by one of these ridges 44. As shown in FIG. 7, each of the channels 43 of the finished cooling liner 35 are then filled with a removable, relatively low melting temperature casting material, such as casting wax 45, leaving only the radially outermost surface 46 of each ridge 44 exposed. If casting wax is used, a knife or similar tool may be positioned perpendicular to any two adjacent ridges and scraped along the length of each channel 43 to remove excess wax and expose the outer surface 46 of each ridge 44 and to remove any casting wax in the channel 43 radially outward of the ridges 44.

An electrode 47 is connected to the finished cooling liner 35, and the entire inner surface 48 of the finished cooling liner 35 and the ends of each channel are then coated with casting wax 45. The finished cooling liner 35 is then placed in an electrolytic solution containing a metal source from which a structural jacket is to be formed. The metal source is connected to another electrode, and opposite polarities are applied to the two electrodes, causing metal to transfer from the metal source to the ridges 44 of the finished cooling liner 35 in the manner known in the art. Since the radially outermost surface 46 of the ridges 44 provides the only conduction sites for metal transferred from the metal source, the metal deposits at the ridges 44 until the metal deposited at adjacent ridges 44 bridges the channel 43 therebetween. This process continues until the structural jacket 49 of the metal has been electro-formed radially outward from the channels 43 of the cooling liner 35 to a desired final thickness. (The final thickness is, of course, determined by the magnitude of the stresses which the structural jacket 49 must withstand when the combustion chamber is in use on a rocket engine.) Since electro-deposition is limited to the ridges 44 of the finished cooling liner 35, the structural jacket 49 is secured to the cooling liner 35 along the length of each ridge 44.

Figure 8:
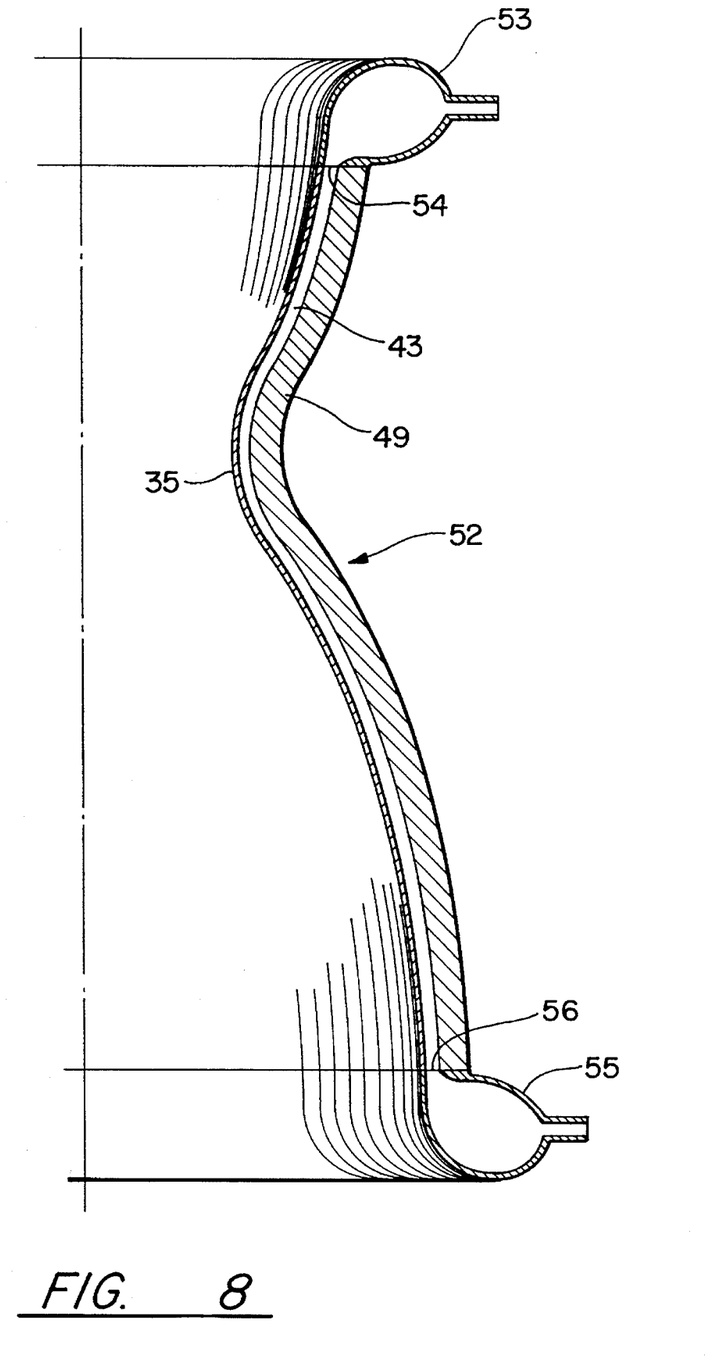
FIG. 8 is a partial cross-sectional view of the finished cooling liner/structural jacket assembly showing the manifolds and the cooling channels.

The finished cooling liner 35 and structural jacket 49 are then removed from the electrolytic solution as an assembly. The wax 45 is then removed from the channels 43, the inner surface 48 of the finished cooling liner 35, and the ends of each channel 43, thereby exposing the axial ends of each of the channels 43. The electrode 47 is removed from the finished cooling liner 35, and any excess material at the axial ends of the finished cooling liner/structural jacket assembly 52 is removed. A first fluid flow manifold 53 is then secured to the first ends 54 of the channels 43 and the structural jacket 49 at one end thereof, and a second fluid flow manifold 55 is secured to the second ends 56 of the channels 43 and the structural jacket 49 at the opposite end thereof for circulating a coolant through the channels 43 as shown in FIG. 8. The manifolds 53, 55 may be secured by brazing, or by other means that are well known in the art.

Figure 9:
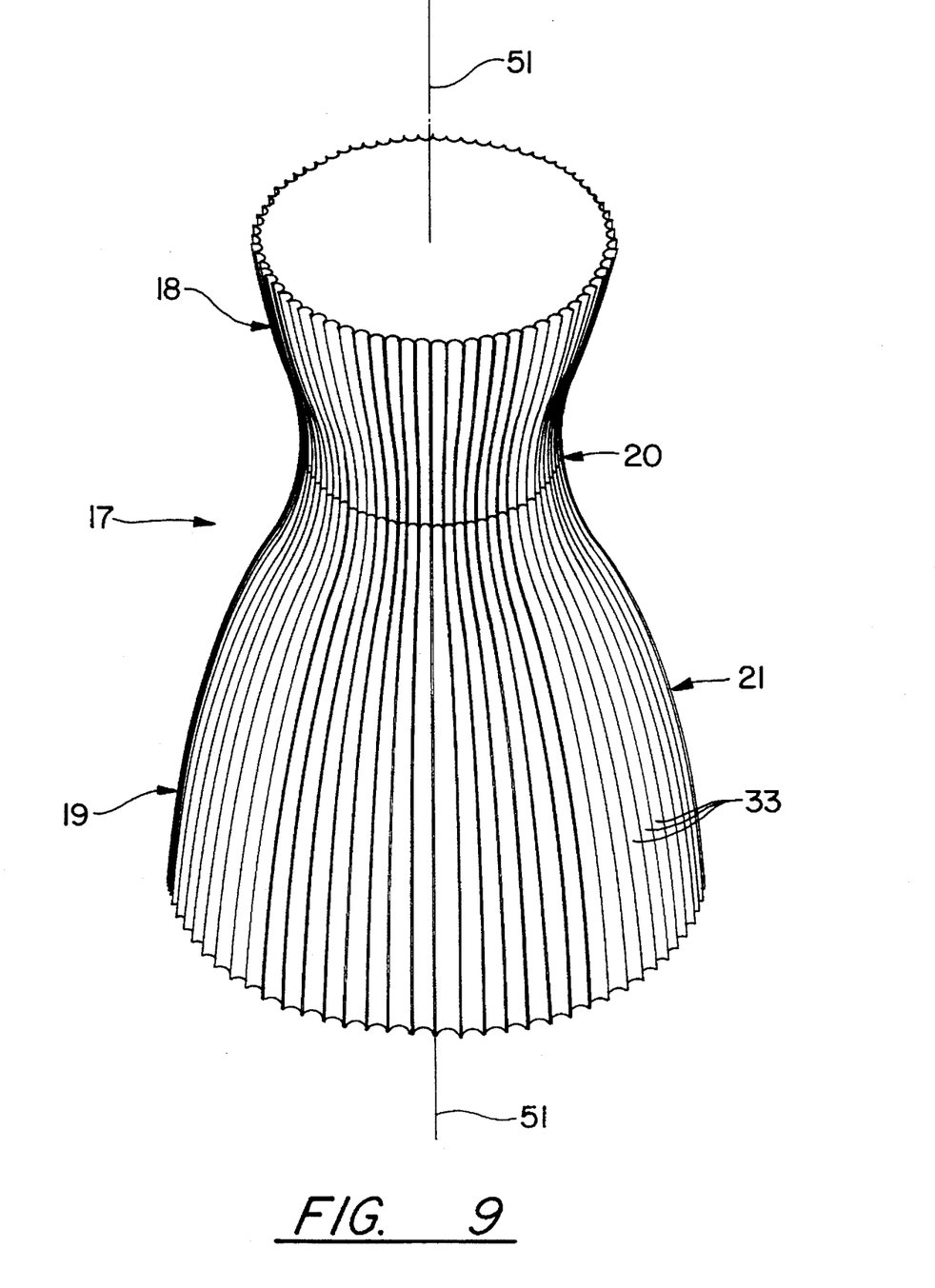
FIG. 9 is a perspective view of the inner die used in the first alternative method.

As a first alternative method to the explosive forming of the finished cooling liner 35 described above, magnetic pulse deformation forming may be used. In the first alternative method, an inner die 17 as shown in FIG. 9 is used. The inner die 17 has a longitudinal axis 51 defined therethrough, and a first piece 18 which can be removably secured to a second piece 19, as shown in FIG. 9. The first piece 18 mates to the second piece 19 at the narrowest diameter 20 of the inner die 17 along the longitudinal axis 51. The inner die 17 has a fluted outer surface 21, with a plurality of troughs 33 extending along the longitudinal axis 51, and the outer surface 21 is coated with a releasing agent. As used herein, the term "fluted" means that for any cross-section of the inner die 17 taken in a plane perpendicular to the longitudinal axis 51, the outer surface 21 defines a plurality of adjacent parabolas or arc-like sections opening outward from the longitudinal axis 51, each arc within such cross-section located at the same distance from the longitudinal axis 51, but at different locations about the circumference of the outer surface 21. Thus, the fluted surface 21 of the first alternative method is the inverse, or complement, of the scalloped surface 12 of the outer die 10 of the preferred embodiment discussed above.

Figure 10:
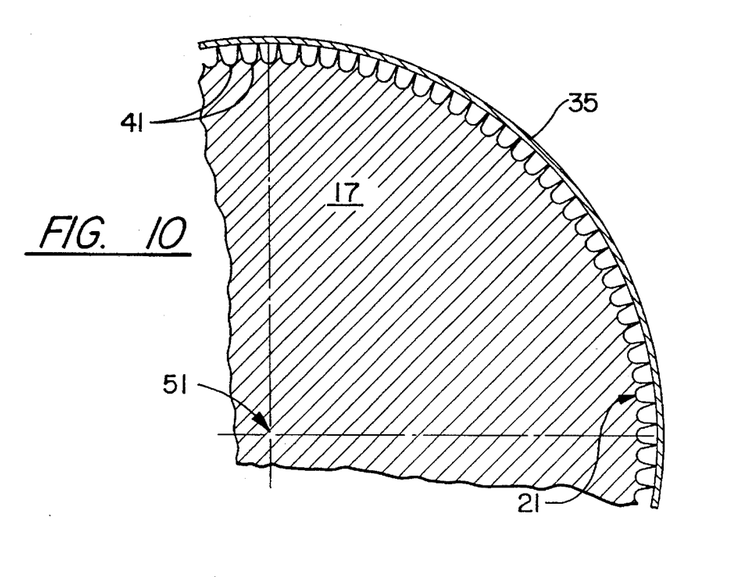
FIG. 10 is the cross-sectional view showing the liner blank in operative contact with the forming surface of the outer surface of the inner die used in the first alternative method.

The first alternative method of the present invention is practiced by positioning the two pieces 18, 19 of the inner die 17 within the liner blank 35 so that the liner blank 35 is in operative contact with the forming surface 21 of the inner die 17 as shown in FIG. 10, and fastening the two pieces 18, 19 together such that the liner blank 35 surrounds the inner die 17 and the liner blank 35 is coaxial with the centerline axis 51 of the inner die 17. The narrowest diameter 20 of the two pieces 18, 19 must be positioned in contact with each other with the troughs 33 of the first piece 18 aligned with the troughs 33 of the second piece 19, and with the narrowest diameter 20 located radially inward of the narrowest diameter of the liner blank 35. The liner blank 35 and inner die 17 are then placed within a magnetic pulse chamber of the type known in the art in which a vacuum is provided, and magnetic pulse forming is used to deform the liner blank 35 to conform to the forming surface 21 of the inner die 17 yielding the finished cooling liner 35. The finished cooling liner 35 is then removed from the inner die 17, and the structural jacket 49 is electro-formed about the finished cooling liner 35 and the manifolds 53, 55 are secured to the finished cooling liner/structural jacket assembly 52 as described previously herein.

Figure 11:
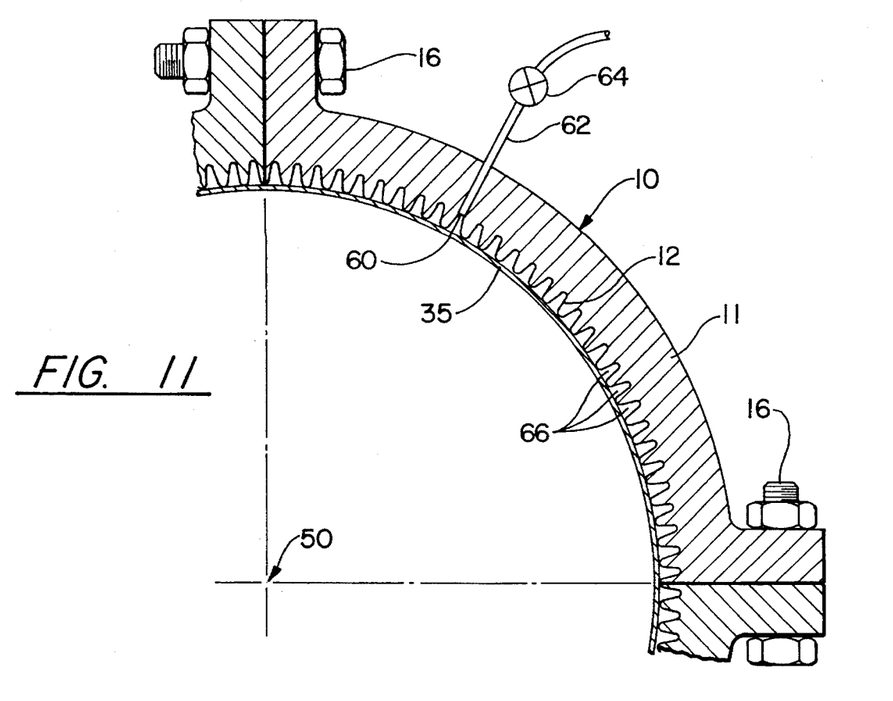
FIG. 11 is a cross-sectional view showing the liner blank in operative contact with the forming surface of the outer die used in the second alternative method.
Figure 12:
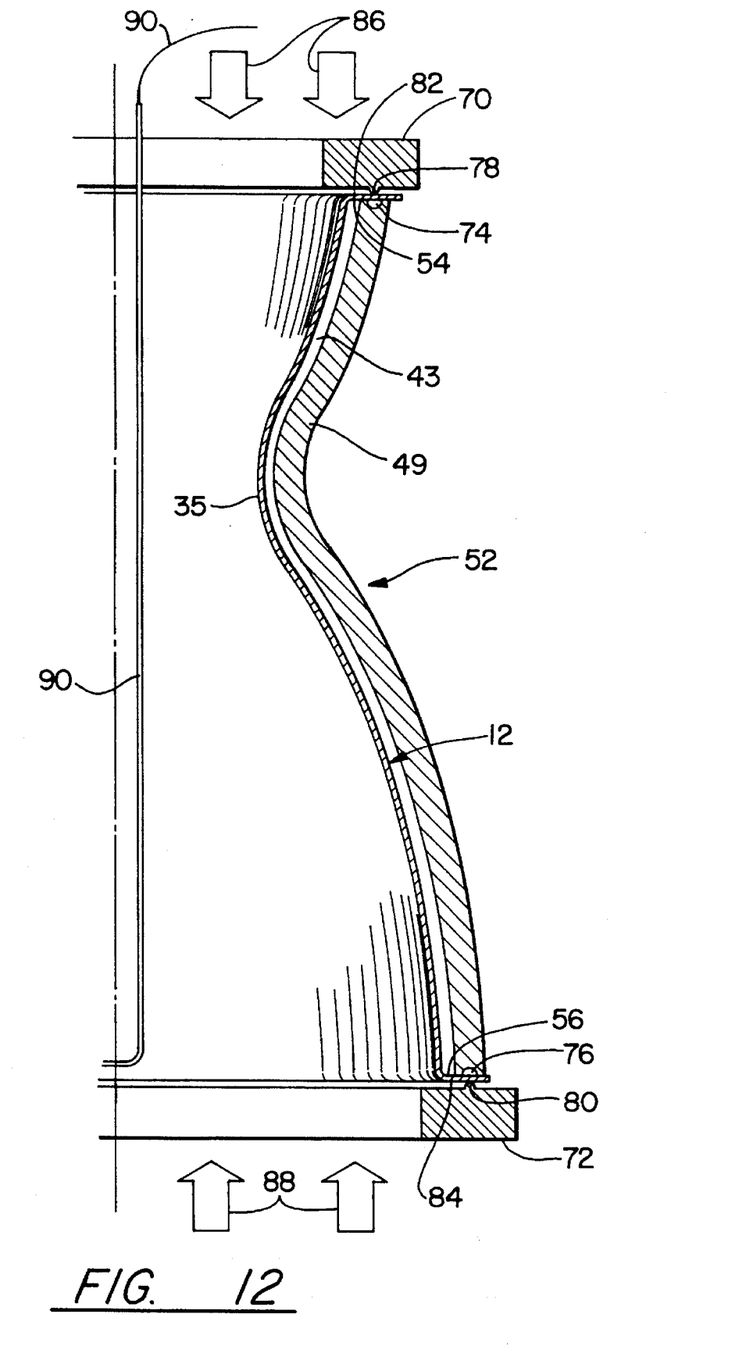
FIG. 12 is a cross-sectional view of the outer die and the end cap rings therefor fixing the liner blank in operative contact with the forming surface of the outer die.

As a second alternative method to the explosive forming or magnetic pulse forming of the finished cooling liner 35 described above, certain superplasticly deformable materials, such as aluminum alloys and titanium alloys, lend themselves to superplastic forming. As used herein, the term "superplasticly deformable materials" means material that at certain temperatures exhibits a high strain-to-fracture ratio that allows the material to be significantly deformed without fracturing. In the second alternative method of the present invention the outer die 10 is modified to include at least one, and preferably several, evacuation ports 60, as shown in FIG. 11, for establishing a vacuum between the liner blank 35 and the inner surface 12 of the outer die 10 as discussed below. An evacuation tube 62 with a valve 64 for selectively allowing or preventing flow therethrough is connected to the evacuation port 60. Additionally, as shown in FIG. 12, one end cap ring 70, 72 is provided for each end 14, 15 of the outer die 10, and each end 14, 15 of the outer die 10 includes an annular channel 74, 76. Each of the end cap rings 70, 72 has an annular ridge 78, 80 that is receivable within the annular channel 74, 76 immediately adjacent thereto. The inner surface 12 is coated with a releasing agent, as in the preferred embodiment. The liner blank 35 is similar to the liner blank 35 described above for the preferred embodiment, except that the liner blank 35 includes a flange 82, 84 at each axial end thereof, as shown in FIG. 12, and the liner blank 35 is made of a material that can be superplasticly deformed such as certain aluminum and titanium alloys that are known in the art.

The second alternative method of the present invention is practiced by positioning the segments 11 of the outer die 10 about the liner blank 35 so that the liner blank 35 is in operative contact with the forming surface 12 of the outer die 10 with each of the flanges 82, 84 extending radially outward beyond the channel immediately adjacent thereto, and the segments 11 are fastened together as described above. The end rings 70, 72 are forced onto the ends of the outer die 10 as shown by the arrows 86, 88 in FIG. 12 so that each of the annular ridges 78, 80 deforms an annular portion of the immediately adjacent flange 82, 84 into the annular channel 74, 76 immediately adjacent thereto. Each end cap ring 70, 72 is then secured to the outer die 10 by fasteners (not shown), sealing the flanges 82, 84 of the liner blank 35 to the axial ends 14, 15 of the outer die 10. The inner surface 12 and the liner blank 35 thus define a cavity 66 which communicates with the ambient atmosphere only through the evacuation port 60, evacuation tube 62 and valve 64. With the valve 60 open, a vacuum source (not shown) is attached to the evacuation tube 62, and the air is removed from the cavity 66. The valve 64 is then closed, thereby isolating the cavity 66 from the ambient atmosphere. A heat source, such as an electric heating element 90, is positioned within outer die 10 radially inward from the liner blank 35. The outer die 10, liner blank 35, end rings 70, 72, and the heating element 90 are then placed into a pressure chamber and the heating element 90 is used to heat the liner blank 35 while the pressure within the chamber is raised. Once the pressure and temperature are raised to conditions at which the liner blank 35 becomes superplastic, this pressure and temperature condition is maintained until the liner blank 35 deforms into contact with the inner surface 12 and fully conforms thereto. The particular pressure and temperature necessary to obtain superplastic deformation of the liner blank 35 depends on the particular material of which the liner blank 35 is made. These pressures and temperatures are well known in the art for most materials that exhibit superplastic characteristics, and therefore are beyond the scope of the present invention. Once the liner blank 35 fully conforms to the inner surface 12, the heating element 90 is removed from the outer die 10, the outer die 10 and liner 35 are removed from the pressure chamber and the end rings are removed from the outer die 10, thereby detaching the liner from the outer die 10. The fasteners 16 of the outer die 10 are removed, allowing the segments 11 to be removed from the finished cooling liner 35. The axial ends of the finished cooling liner 35 are machined as necessary to remove the flanges, and the structural jacket 49 is electro-formed about the finished cooling liner 35 and the manifolds 53, 55 are secured to the finished cooling liner/structural jacket assembly 52 as described previously herein.

Using the method of the present invention, a fluid cooled combustion chamber can be manufactured which has a cooling liner 35 that is free of welds or braze joints, failure of which often limit the useful life of prior art cooling liners. The cooling channels 43 of the finished cooling liner 35 can be tailored to obtain specific heat transfer characteristics by varying the shape of the ribs 32 (and troughs 33) of the die 10, 17 as desired. The method of the present invention is less labor intensive than many of the prior art methods of producing combustion chambers, and thus the cost of manufacturing using the present invention is significantly less than the prior art once the cost of the dies 10, 17 has been amortized. The present invention thus represents a substantial improvement over methods of the prior art.

Although this invention has been shown and described with respect to detailed embodiments thereof, it will be understood by those skilled in the art that various changes in form and detail thereof may be made without departing from the spirit and scope of the claimed invention.

We claim:

1. A method of making a rocket combustion chamber/nozzle assembly incorporating a finished cooling liner, said method comprising:

providing a die having a centerline axis defined therethrough and first and second axial ends, said die comprising a plurality of segments which extend axially along the centerline and radially about the centerline, each segment having a scalloped inner surface defining the forming surface of the die, said forming surface of the die extending between the first and second axial ends of said die;

providing a cooling liner blank of thin, high temperature resistant material, said liner blank having opposed first and second ends;

positioning the liner blank in operative contact with the forming surface of the die;

deforming the liner blank to conform to the shape of the forming surface, thereby forming a finished cooling liner having a fluted outer surface comprising a plurality of longitudinally extending channels and a plurality of ridges extending the length of the channels, each channel having a first end, and a second end opposite the first end, and each channel separated from each immediately adjacent channel by one of said ridges;

filling each of the channels with a removable casting material, leaving only the radially outermost surface of each ridge exposed;

electro-forming a structural jacket radially outward from the channels of the cooling liner, said jacket secured to the cooling liner along the length of each ridge by electro-deposition;

removing the removable casting material from the channels, thereby exposing the axial ends of each of the channels; and, securing a first fluid flow manifold to the first ends of the channels, and securing a second fluid flow manifold to the second ends of the channels for circulating a coolant through the channels.

2. The method of claim 1 wherein the liner blank has a converging section coaxial with the centerline axis, and a diverging section coaxial with the centerline axis, and the diverging section is integral with the converging section.

3. The method of claim 2 wherein the removable casting material is wax.

4. The method of claim 3 wherein the liner blank is made of copper.

5. The method of claim 1 wherein the step of deforming the liner blank to conform to the shape of the forming surface includes placing an explosive material radially inward of the liner blank, and detonating the explosive material thereby generating a pressure shock that deforms the liner blank to conform to the forming surface of the die.

6. The method of claim 5 wherein the liner blank has a converging section coaxial with the centerline axis, and a diverging section coaxial with the centerline axis.

7. The method of claim 6 wherein the removable casting material is wax.

8. The method of claim 7 wherein the liner blank is made of copper.

9. The method of claim 1 wherein the step of deforming the liner blank to conform to the shape of the forming surface includes sealing to the ends of the liner blank to the die thereby defining a cavity between the liner and the die, establishing a vacuum within the cavity, and placing the liner blank and the die within a pressure chamber and subjecting the liner blank and die to a pressure and temperature at which the liner blank superplasticly deforms into contact with the forming surface and conforms thereto.

10. The method of claim 9 wherein the liner blank has a converging section coaxial with the centerline axis, and a diverging section coaxial with the centerline axis.

11. The method of claim 10 wherein the removable casting material is wax.

12. The method of claim 11 wherein the liner blank is made of a superplasticly deformable material.

13. A method of making a rocket combustion chamber/nozzle assembly incorporating a finished cooling liner, said method comprising:

providing a die having a centerline axis defined therethrough and first and second axial ends, said die comprising a first piece which mates with a second piece, said die having a narrowest diameter along the centerline axis, and said first piece mates to said second piece at the narrowest diameter, said die having a fluted outer surface defining the forming surface of the die, said forming surface of the die extending between first and second axial ends of said die;

providing a cooling liner blank of thin, high temperature resistant material, said liner blank having opposed first and second ends;

positioning the liner blank in operative contact with the forming surface of the die;

deforming the liner blank to conform to the shape of the forming surface, thereby forming a finished cooling liner having a fluted outer surface comprising a plurality of longitudinally extending channels and a plurality of ridges extending the length of the channels, each channel having a first end, and a second end opposite the first end, and each channel separated from each immediately adjacent channel by one of said ridges;

filling each of the channels with a removable casting material, leaving only the radially outermost surface of each ridge exposed;

electro-forming a structural jacket radially outward from the channels of the cooling liner, said jacket secured to the cooling liner along the length of each ridge by electro-deposition;

removing the removable casting material from the channels, thereby exposing the axial ends of each of the channels; and, securing a first fluid flow manifold to the first ends of the channels, and securing a second fluid flow manifold to the second ends of the channels for circulating a coolant through the channels.

14. The method of claim 13 wherein the step of deforming the liner blank to conform to the shape of the forming surface includes placing the liner blank and die in a magnetic pulse chamber, and using magnetic pulses to generate shock waves that deform the liner blank to conform to the forming surface of the inner die.

15. The method of claim 14 wherein the liner blank has a converging section coaxial with the centerline axis, and a diverging section coaxial with the centerline axis, and the diverging section is integral with the converging section.

16. The method of claim 15 wherein the removable casting material is wax.

17. The method of claim 16 wherein the liner blank is made of copper.

* * * * *

UNITED STATES PATENT AND TRADEMARK OFFICE
CERTIFICATE OF CORRECTION

PATENT NO. : 5,473,817
DATED : December 12, 1995
INVENTOR(S) : Richard J. Schnoor et al It is certified that error appears in the above-indentified patent and that said Letters Patent is hereby corrected as shown below:

In column 1, at line 4, replace "08/17/090" with --08/171,090--.

Signed and Sealed this

Twenty-sixth Day of March, 1996

Attest:

BRUCE LEHMAN

Attesting Officer     Commissioner of Patents and Trademarks